(12) United States Patent
Min

(10) Patent No.: US 7,237,891 B2
(45) Date of Patent: Jul. 3, 2007

(54) EYEWEAR WITH REMOVABLE SHIELD

(75) Inventor: Kyung Min, Seoul (KR)

(73) Assignee: KBC America, Inc., Burbank, CA (US)

( * ) Notice: Subject to any disclaimer, the term of this patent is extended or adjusted under 35 U.S.C. 154(b) by 0 days.

(21) Appl. No.: 11/173,164

(22) Filed: Jul. 5, 2005

(65) Prior Publication Data

US 2006/0061728 A1    Mar. 23, 2006

Related U.S. Application Data

(60) Provisional application No. 60/584,677, filed on Jul. 2, 2004.

(30) Foreign Application Priority Data

Nov. 27, 2003   (KR) .......................... 2003-0037096

(51) Int. Cl.
*G02C 7/08*   (2006.01)
(52) U.S. Cl. .............. 351/57; 351/47; 351/62
(58) Field of Classification Search ............. 351/41, 351/44, 47, 48, 57, 58, 83, 86, 62
See application file for complete search history.

(56) References Cited

U.S. PATENT DOCUMENTS

| 1,720,814 | A | 2/1928 | Baker |
| 1,741,427 | A | 12/1929 | Meyrowitz |
| 1,754,694 | A | 4/1930 | Neuwirth |
| 1,846,679 | A | 2/1932 | Fischer |
| 1,853,872 | A | 4/1932 | Meyrowitz |
| 1,936,746 | A | 11/1933 | Baker |
| 2,387,821 | A | 10/1945 | Baratelli et al. |
| 3,419,909 | A | 1/1969 | Spain |
| 4,264,987 | A | 5/1981 | Runckel |
| 4,468,819 | A | 9/1984 | Ohno |
| 4,741,611 | A | 5/1988 | Burns |

(Continued)

FOREIGN PATENT DOCUMENTS

FR       321.010       7/1902

(Continued)

*Primary Examiner*—Huy Mai
(74) *Attorney, Agent, or Firm*—Miles & Stockbridge, P.C.; Edward J. Kondracki

(57) ABSTRACT

A pair of multi-purpose eyeglasses comprises a main frame made from metal and including a lens holder for holding lenses, a pair of temple arms connected to both sides of the lens holder, and a pair of nose pads connected through a pair of pad arms to middle portions of the lens holder, each of the pad arms having a pad arm groove formed on a lens-side of the pad arm, the pad arm groove having a stepped portion formed therein; an inner frame detachably assembled with an inside of the main frame, the inner frame having inner frame grooves formed on middle portions of the inner frame corresponding to the pad arm grooves; and a sealing member attached to an inside of the inner frame, the sealing member including a sponge portion and a leather portion attached onto the sponge portion. When the inner frame is assembled with the main frame, the middle portions of the inner frame on which the inner frame grooves are formed are inserted in the pad arm grooves while each of the inner frame grooves of the inner frame is engaged with and supported by the stepped portion formed in each of the pad arm grooves.

20 Claims, 2 Drawing Sheets

U.S. PATENT DOCUMENTS

| | | |
|---|---|---|
| 4,785,481 A | 11/1988 | Palmer, III et al. |
| 4,934,807 A | 6/1990 | Bolle et al. |
| 5,300,963 A | 4/1994 | Tanaka |
| 5,388,269 A | 2/1995 | Griffin |
| 5,548,351 A | 8/1996 | Hirschman et al. |
| 5,614,963 A | 3/1997 | Parker |
| 5,657,106 A * | 8/1997 | Herald et al. ................. 351/57 |
| 5,802,622 A | 9/1998 | Bahaarad et al. |
| 5,898,468 A | 4/1999 | Mage |
| 6,050,684 A | 4/2000 | Mage |
| 6,062,688 A | 5/2000 | Vinas |
| 6,076,196 A | 6/2000 | Masumoto |
| D428,913 S | 8/2000 | Kopfer |
| 6,233,342 B1 | 5/2001 | Fernandez |
| 6,282,727 B1 | 9/2001 | Lindahl |
| 6,386,702 B1 | 5/2002 | Maloncon |
| 6,641,263 B2 | 11/2003 | Olney |
| 6,723,336 B1 | 4/2004 | Melrose |
| 6,749,299 B1 | 6/2004 | Hsu |
| 6,817,709 B2 | 11/2004 | Min |
| 6,979,081 B2 * | 12/2005 | Zelman ...................... 351/57 |
| 2002/0029408 A1 | 3/2002 | Lindahl |
| 2002/0033930 A1 | 3/2002 | Min |
| 2003/0056281 A1 | 3/2003 | Hasegawa |
| 2003/0123022 A1 | 7/2003 | Mulvey |

FOREIGN PATENT DOCUMENTS

FR     324.973     10/1902

* cited by examiner

EYEWEAR WITH REMOVABLE SHIELD

CROSS REFERENCE TO RELATED APPLICATIONS

This application claims the benefit under 35 U.S.C. §119(e) to U.S. Provisional Application Ser. No. 60/584,677 filed Jul. 2, 2004, which is incorporated herein by reference in its entirety.

BACKGROUND OF THE INVENTION

Field of the Invention

The subject application relates to eyewear. When eyewear is provided with a detachable shield, a suitable attachment means is needed.

DESCRIPTION OF THE PREFERRED EMBODIMENT

Eyewear with removable shield are described and illustrated in application Ser. No. 10/608,123 filed Jun. 30, 203 and U.S. Pat. No. 6,817,706 granted Nov. 16, 2004, U.S. Pat. No. 6,793,336 granted Sep. 21, 2004, and Korean Application 2003-0037096, translation included as an appendix. The subject matter of all of which are incorporated herein by reference in their entirety.

Figure 1:
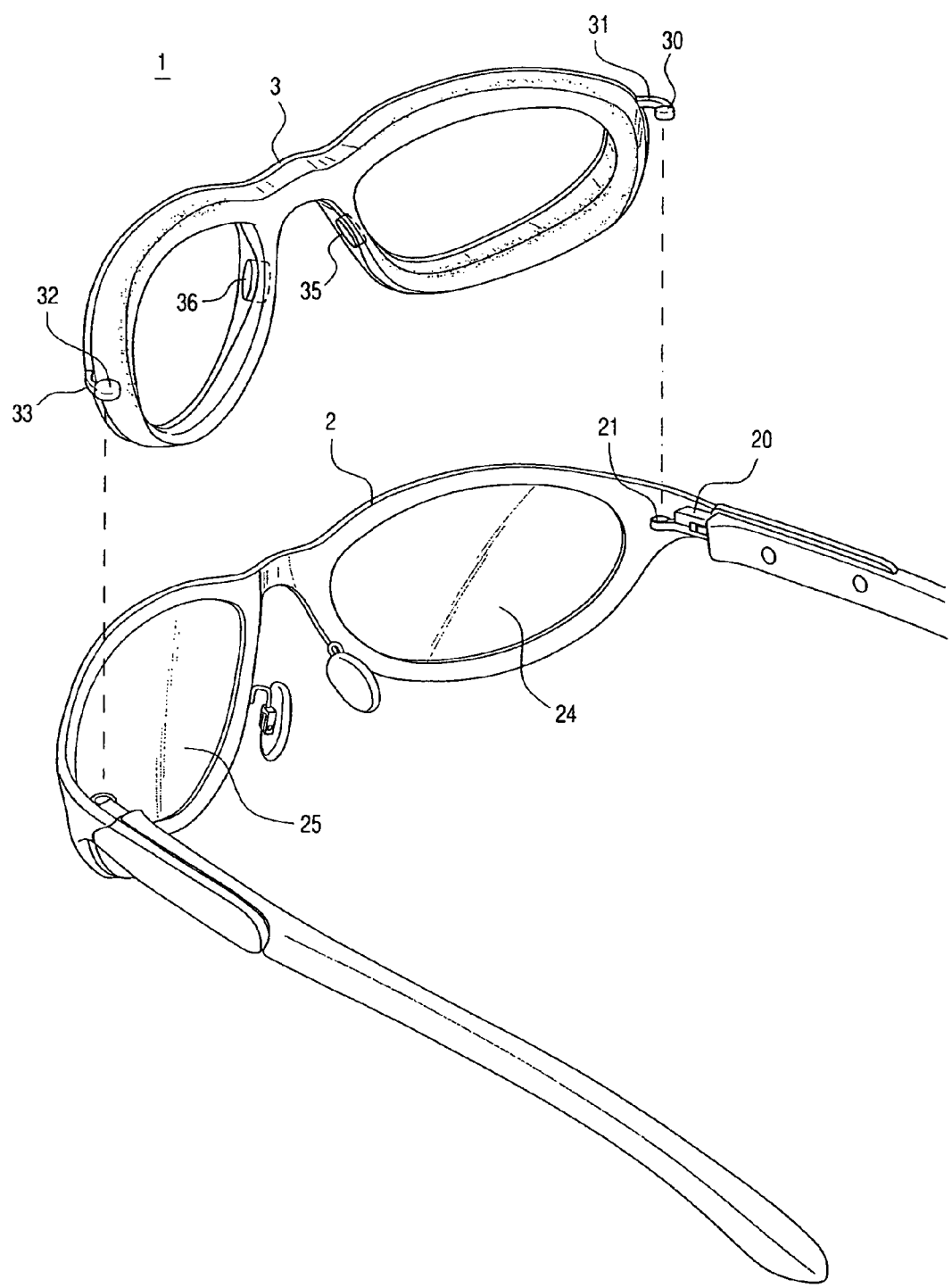
FIG. 1 shows an exploded perspective view of an embodiment of eyewear 1. Eyewear 1 according to the inventive concept includes eyeglass frame 2. Rearwardly disposed inner frame 3 may be provided which, advantageously, is removable from eyeglass frame 2. Eyeglass frame 2 may be constructed of a variety of materials, such as, for example, metal, plastic, etc., while inner frame 3 may also be constructed of a variety of materials, including metal, plastic, etc. Eyeglass frame 2 may include left lens 24 and right lens 25, which may be removable, non-removable, prescription, non-prescription, etc. In an embodiment, inner frame 3 may include left vent 35 and right vent 36.
Figure 2:
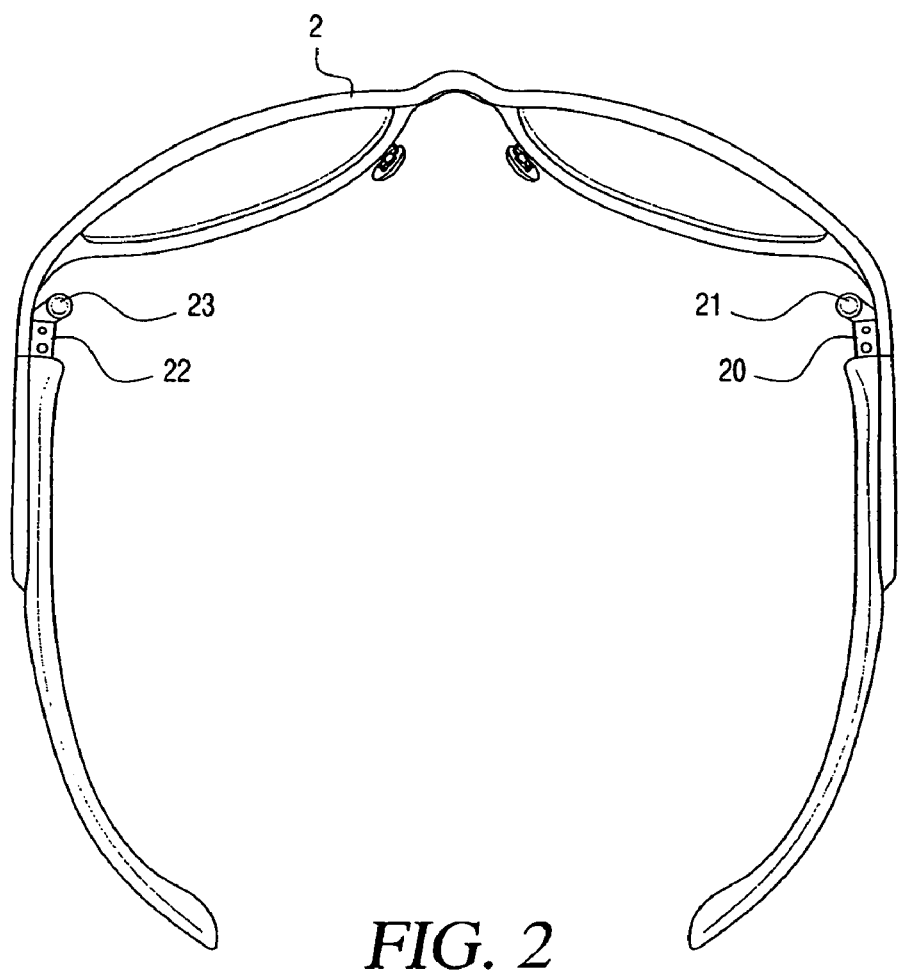
FIG. 2 depicts a top view of an embodiment of eyeglass frame 2. Left frame member 20 may include magnet 21, while right frame member 22 may include magnet 23.
Figure 3:
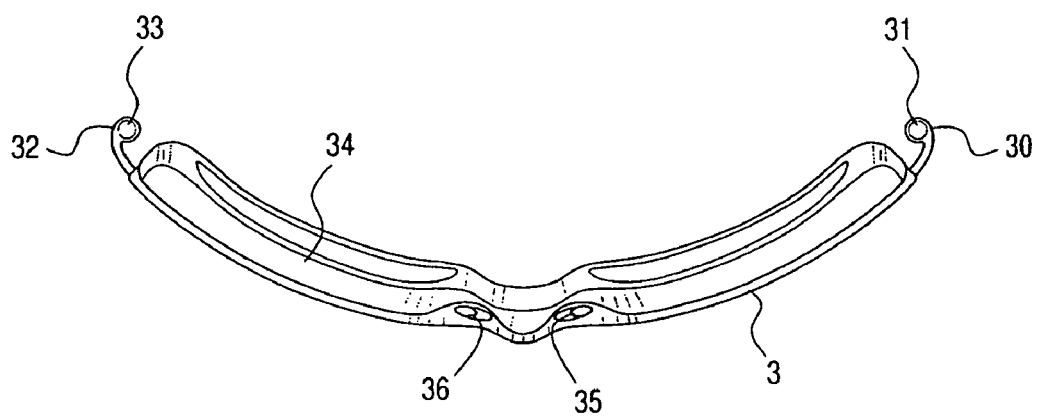
FIG. 3 presents a bottom view of an embodiment of inner frame 3. Left frame extension 30 may include magnet 31, while right frame extension 32 may include magnet 33. Alternatively, a magnetically attractable metallic material may be used for two of the magnet pairs 31 and 33 or 21 and 23. Use of four magnets, however, assures greater holding capability. In an embodiment, inner frame 3 includes rearwardly disposed pad 34, which minimizes the airflow impacting the eyes from around the perimeter of eyewear 1. Pad 34 may be constructed of air-permeable foam, or other similar material.

FIGS. 1, 2 and 3 illustrate an embodiment of the attachment between eyeglass frame 2 and inner frame 3. Left frame extension 30 is adapted to magnetically engage left frame member 20 of eyeglass frame 2 using magnets 31 and 21. Similarly, right frame extension 32 is adapted to magnetically engage right frame member 22 using magnets 33 and 23.

The magnetic attachment arrangement of the present invention eyewear of the type described and illustrated in the aforenoted U.S. Pat. Nos. 6,817,709 and 6,793,336, and application Ser. No. 10/608,123.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. Eyewear comprising:
   an eyeglass frame, including:
   a left and a right frame member joined together by a nosepiece;
   said left frame member having a first element, said first element extending from said left frame member;
   said right frame member having a second element, said second element extending from said right frame member; and wherein said eyewear further comprises:
   a padded removable inner frame, including:
   a left and a right frame extension joined together at adjacent ends;
   said left frame extension having a third element adapted to magnetically engage said first element; and
   said right frame extension, having a fourth element adapted to magnetically engage said second element, whereby said inner frame is removably coupled to said eyeglass frame upon breaking said magnetic engagements.

2. Eyewear as set forth in claim 1, wherein said first and second elements are magnets.

3. Eyewear as set forth in claim 1, wherein said third and fourth elements are magnets.

4. Eyewear as set forth in claim 1, wherein said first, second, third, and fourth elements are magnets.

5. Eyewear as set forth in claim 1, further including a pad on said inner frame, said pad having a shape corresponding to the shape of said inner frame.

6. Eyewear as set forth in claim 5, wherein said pad comprises a foam material.

7. Eyewear comprising:
   an outer frame, including:
   a left and a right outer frame member joined together by a nosepiece; wherein
   said left frame member has a first inwardly extending extension;
   said right frame member has a second inwardly extending extension; and wherein said eyewear further comprises:
   a padded removable inner frame, including:
   a left and a right inner frame extension member joined together by a crosspiece; and
   an element coupled to each of said left and right inner frame extension members and said left and right inwardly extending extensions, and which magnetically and removably couples said inner frame to said outer frame.

8. Eyewear as set forth in claim 7, wherein said elements coupled to said inner extensions members are magnets.

9. Eyewear as set forth in claim 8, wherein said elements coupled to said inwardly extending extensions are magnets.

10. Eyewear as set forth in claim 7, wherein said elements coupled to both said inner extensions members and said inwardly extending extensions are magnets.

11. Eyewear comprising:
    an outer frame including:
    a left and a right outer frame member joined together by a nosepiece;

said left frame member having a first inwardly extending extension;

said right frame member having a second inwardly extending extension; and wherein said eyewear further comprises:

a removable inner frame, including:

a left and a right inner frame member joined together by a crosspiece;

said left outer frame member having a first outwardly extending extension;

said right outer frame member having a second outwardly extending extension;

a pad element on said inner frame; and cooperating magnetic elements coupled to at least one of said inwardly and outwardly extending extensions, whereby said inner frame is magnetically and removably coupled to said outer frame.

12. Eyewear as set forth in claim 11, wherein each of said magnetic elements comprise magnetically attractable metallic material and a magnet.

13. Eyewear as set forth as claim 12, wherein said pad element comprises a foam material.

14. Eyewear as set forth in claim 11, wherein said magnetic elements coupled to said inwardly extending extensions are magnets, said magnets disposed thereon, and said magnetic elements coupled to said outwardly extending extensions comprise magnetically attractable metallic material.

15. Eyewear as set forth in claim 14, wherein said pad element comprises a foam material.

16. Eyewear as set forth in claim 11, wherein said magnetic elements coupled to said outwardly extending extension are magnets, said magnets disposed thereon, and said magnetic elements coupled to said inwardly extending extensions comprise magnetically attractable metallic material.

17. Eyewear as set forth in claim 16, wherein said pad element comprises a foam material.

18. Eyewear as set forth in claim 11, wherein said magnetic elements are magnets, said magnets disposed on each of said inwardly and outwardly extending extensions.

19. Eyewear as set forth in claim 11, wherein said inner frame is disposed between said outer frame and said inwardly extending extensions such that said inwardly and outwardly extensions engage each other.

20. Eyewear as set forth in claim 19, wherein the shape of said pad element corresponds to the shape of said inner frame.

* * * * *